W. H. Lewis.
Insect Destroyer.

Nº 99,214.        Patented Jan. 25, 1870.

Witnesses:
Inventor:

United States Patent Office.

WILLIAM H. LEWIS, OF NEW YORK, ASSIGNOR TO RICHARD A. LEWIS, OF BROOKLYN, N. Y.

*Letters Patent No. 99,214, dated January 25, 1870; antedated January 21, 1870.*

---

IMPROVEMENT IN DEVICE FOR DESTROYING INSECTS.

---

The Schedule referred to in these Letters Patent and making part of the same.

---

*To all whom it may concern:*

Be it known that I, WILLIAM H. LEWIS, of the city and State of New York, have invented and made a new and useful Improvement in Destroying Insects; and I do hereby declare the following to be a full, clear, and exact description of the same, reference being had to the annexed drawing, making part of this specification, wherein—

The same parts are denoted by like letters.

Figure 1:
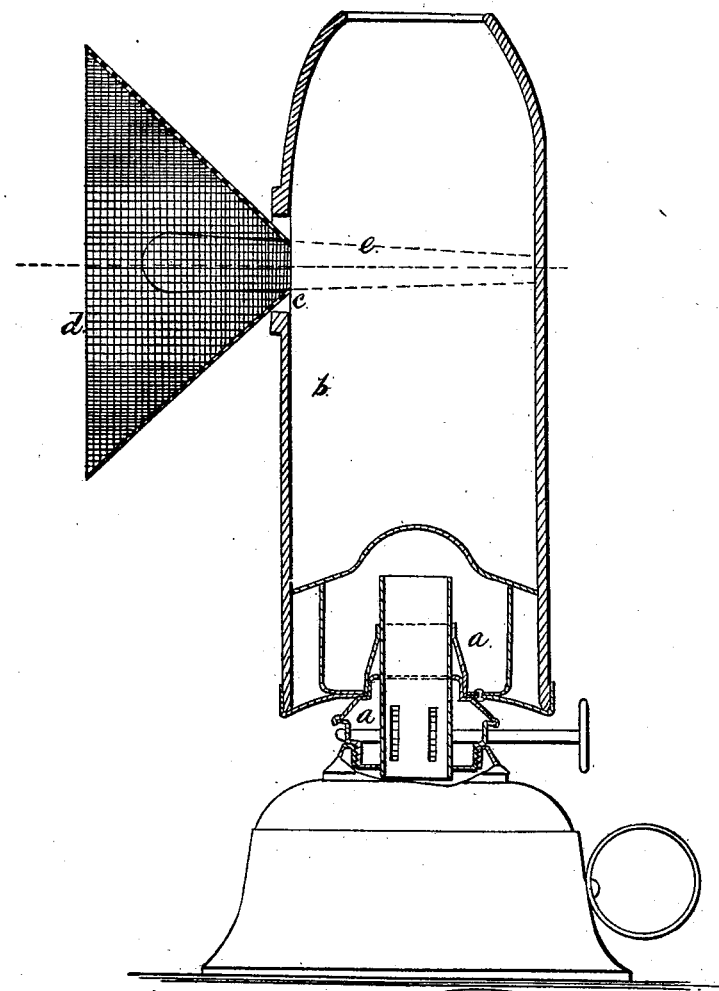
Figure 1 is a vertical section.
Figure 2:
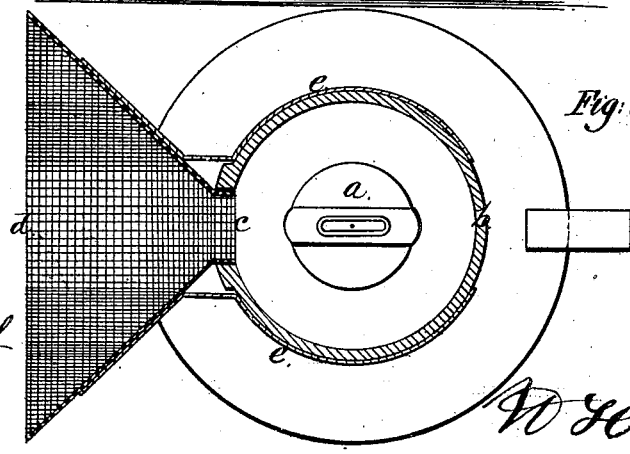
Figure 2 is a sectional plan of the apparatus employed by me.

Heretofore, great difficulty has been experienced in destroying insects, particularly mosquitoes, for if they are struck against the wall, ceiling, or furniture, an objectionable stain is generally produced.

Almost all insects are attracted by light, and I avail of this to draw the insects on to destruction, and avail of the draught produced by the heat of a lamp or fire, to draw the insects into the heat, where they are destroyed.

In the drawing—

$a$ represents the burner of any lamp or other source of light and heat;

$b$ is a glass chimney, of suitable size and shape, in the side of which is an opening at $c$; and $d$, is a funnel for directing the insect to the opening $c$.

I have shown this funnel $d$, as made of fine wire gauze, so as not to cast a shadow, and the same is held to the chimney by a spring-clasp or band, $e$.

The funnel $d$ may be of any desired size or shape, and it may be made of glass, in one piece with the chimney, or it may be of other suitable material.

It will now be understood that the funnel or flaring mouth being placed over the mosquito or other insect, there is no other escape than through the lamp-chimney, and the draught of air aids in causing the insect to pass into the chimney, where the heat destroys life instantly, with small insects, or so injures larger ones that they die quickly.

This improvement may be made in a light, portable form, or else in a larger form, to attract insects into the same by the light, and the flaring or funnel-mouth may stand at any desired angle to the chimney, or be adjustable in that respect, so as to be adapted to the place upon which the insect may be at the time this catcher or destroyer is employed as aforesaid.

What I claim, and desire to secure by Letters Patent, is—

The funnel $d$ and opening $c$, applied to and combined with the glass chimney of a lamp, as and for the purposes set forth.

In witness whereof, I have hereunto set my signature, this 29th day of June, A. D. 1869.

W. H. LEWIS.

Witnesses:
CHAS. H. SMITH,
GEO. T. PINCKNEY.